United States Patent Office 3,264,898
Patented August 9, 1966

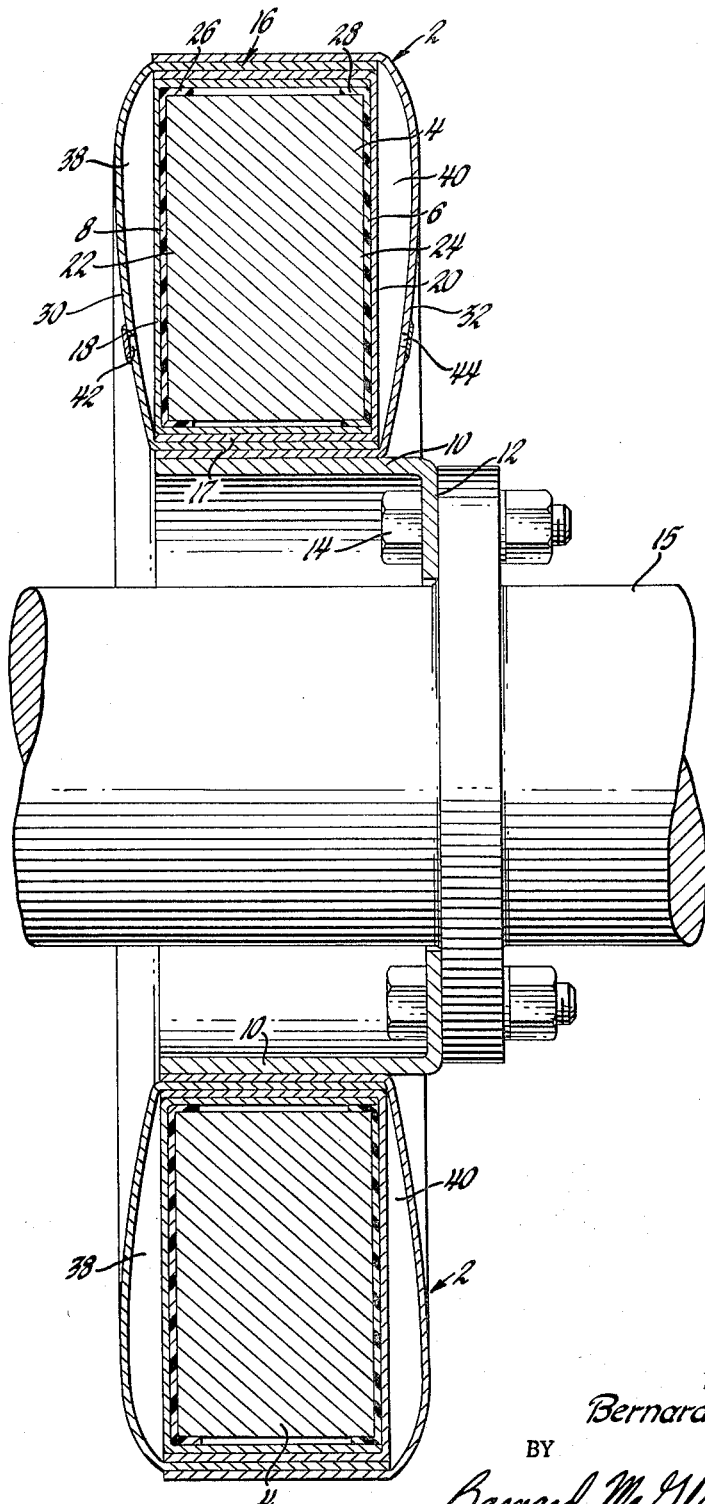

3,264,898
TORSIONAL VIBRATION DAMPER
Bernard E. O'Connor, 8904 Rindge, Playa Del Rey, Calif.
Filed July 29, 1964, Ser. No. 385,952
5 Claims. (Cl. 74—574)

The subject matter of the present invention is an improved torisonal vibration damper and more particularly a torsional vibration damper of the Lanchester or frictional type such as used on the crankshaft of a piston type internal combustion engine.

A friction type torsional vibration damper consists, in general, of an annular inertia member which is supported concentrically about the crankshaft for rotation with respect thereto and which is in frictionally slidable contact with an annular member fixably secured to the crankshaft for rotation therewith. In the absence of torsional vibration and at relatively constant crankshaft speed the two annular members rotate together with the crankshaft; however where there is torsional vibration the one annular member undergoes frictional slippage with respect to the other by reason of the momentary accelerations which are characteristic of torsional vibration, the vibratory energy thereby being absorbed and dissipated. In the conventional damper of this type, springs are used to urge the two members toward each other and provide the frictional contact therebetween. However, with such structure the frictional contact pressure between the two members is constant and independent of engine speed. Actually, for optimum damping over a wide range of engine speeds what is required is a damper wherein the frictional contact pressure between the two members is a function of the engine speed, with light pressure at low r.p.m. and greater pressure at a high r.p.m.

It is a principal object of the present invention to provide an improved torsional vibration damper which is of relatively simple and therefore inexpensive construction and yet which incoroprates means for varying the frictional contact pressure in accordance with rotary speed. Briefly, this is accomplished in accordance with the invention by a damper which comprises an annular casing adapted to be secured concentrically to the crankshaft or other rotary member for rotation therewith, such casing having a chamber therein containing a liquid, and an annular inertia member supported concentrically within said casing for rotation with respect thereto the inertia member being in frictional contact with a wall of the fluid chamber such that the frictional contact pressure between the casing and the inertia member is proportional to the fluid pressure in the chamber. Hence, at low r.p.m. the frictional contact pressure will be relatively low since the fluid pressure at such r.p.m. is relatively low; however, as rotary speed increases the fluid pressure becomes greater because of centrifugal force and the increased fluid pressure causes a commensurate increase in the frictional contact pressure between the casing and the inertia member. In the preferred embodiment of the invention two annular fluid chambers are provided with the inner walls thereof in opposed spaced relationship and with the annular inertia member sandwiched therebetween with its side walls in frictional contact with the inner side walls of the fluid chambers. Hence with increased speed of rotation there is increased frictional pressure on both sides of the inertia member.

These and other features, objects and advantages of the invention will appear more clearly from the following detailed description made with reference to the drawing which shows a sectional view of the preferred embodiment.

Referring now to the drawing, the damper comprises an annular metal casing 2, described in detail hereinafter, an annular metal inertia member 4, supported concentrically within the casing by a pair of ringshaped flexible friction pads 6 and 8 whereby the inertia member is rotatable in frictional sliding engagement within and with respect to the casing, and a hub 10 secured as by welding or brazing to the inner cylindrical rim wall of the casing. The hub 10 has a radially inwardly extending flange portion 12 with a plurality of circumferentially arranged openings which receive bolts 14 for securing the damper to a flange provided on the crankshaft 15. Hence, the damper is fixedly secured in concentric relationship to the crankshaft for rotation therewith.

The casing 2 has a cylindrical peripheral wall 16, an inner rim wall 17 and thin resilient inner side walls 18 and 20 adjacent the flat side surfaces 22 and 24 of the inertia member. The ring-shaped flexible friction pads 6 and 8 are positioned against the thin flat metal walls 18 and 20 of the casing constituting, in effect, the outer surfaces thereof and are in contact with the flat annular sides 22 and 24 of the inertia member. Peripheral axially extending flanges 26 and 28 on the friction pads contact the outer cylindrical surface of the inertia member to support the inertia member in concentric relationship within the casing. The preferred material for the friction pads is an organic plastic material such as polytetrafluoroethylene, preferably a cloth woven of polytetrafluoroethylene threads and embedded in a matrix of hard thermosetting resin such as phenolformaldehyde, as shown in U.S. Reissue Patent 24,765. The friction pads can be bonded by the phenolic resin to the inner side walls 18 and 20, the polytetrafluoroethylene threads of the friction pads being exposed at the surfaces thereof in sliding engagement with the inertia member.

The inner walls 18 and 20 are enclosed within outer casing side walls 30 and 32, which in combination with the inner side walls, form two sealed annular chambers 38 and 40 each of which is filled with liquid. Constant viscosity silicone oil such as is commonly used in viscose type torsional vibration dampers is satisfactory as the liquid though others can be used if desired. Suitable openings such as shown at 42 and 44 are provided to admit the liquid into the annular chambers; such openings can be welded shut after the liquid is admitted.

For simplicity of manufacture the casing is formed by an inner pair of metal stampings having inner and outer cylindrical walls which depend from the sidewalls 18 and 20 and which telescope together to form an inner hollow annulus for reception of the friction pads and the inertia member as shown. A second pair of slightly larger metal stampings having inner and outer cylindrical side walls depending from the side walls 30 and 32 likewise telescope together to form a hollow annulus surrounding that formed by the inner pair of stampings. The inner and outer cylindrical walls of the stampings are bonded together as by welding or brazing to seal the chambers 38 and 40.

To provide a maximum strength-to-weight ratio for the casing, the side walls 30 and 32 are outwardly bowed such that the cross sectional curvature thereof is a developed curve as described in detail and claimed in my copending U.S. patent application 385,951 filed concurrently herewith.

Operation is as follows: In the absence of torsional vibration in the crankshaft 15 and with the crankshaft rotating at relatively low r.p.m., the inertia member 4 and the casing 2 rotate as a unit with the crankshaft by reason of the frictional engagement between the inertia member and the casing through the frictional pads 6 and 8. With torsional vibration at the low r.p.m., there is slippage between the inertia member and the casing upon the momentary accelerations characteristic of torsional vibration, such slippage being relatively easy because of the relatively light frictional contact pressure between the inertia member and the friction pads which form the outer surfaces of the side walls 22 and 24 of the casing, such pressure being almost entirely due to the inherent resilience of the side walls which function to provide relatively constant spring pressure. At high uniform crankshaft speed and in the absence of torsional vibration the inertia member and casing rotate as a unit with the crankshaft just as at low uniform rotational speed. Upon torsional vibration at high speed there is slippage between the inertia member and the casing; however such slippage is relatively difficult because of the relatively high frictional contact pressure between the friction pad surfaced side walls 22 and 24 of the casing and the inertia member. The high frictional contact pressure results from the high fluid pressure within the chambers caused by the considerable centrifugal force exerted on the fluid within the chambers. The high fluid pressure causes increased pressure against the inner side walls 18 and 20 which, because flexible, distort toward each other into tighter or increased frictional contact with the inertia member. Hence, there is provided a relatively simple and inexpensive frictional vibration damper wherein the frictional contact pressure between the frictionally engaged relatively movable members is a function of rotational speed.

If desired spring members biased between the inner and outer side walls of the casing can be used to supplement or replace the function of the resilient inner side walls as springs. Also the adjacent surfaces of the inertia member and the casing can be made of concave or convex section instead of flat as shown. Various other possible changes and modifications will be obvious to those skilled in the art. Hence it will be understood that whereas the invention has been described specifically with reference to a preferred embodiment thereof changes may be made all within the full and intended scope of the claims which follow.

I claim:

1. A torsional vibration damper comprising a round casing adapted to be secured to a rotary member for rotation therewith, said casing having a chamber therein containing a liquid and an inertia member supported within said casing for rotation with respect thereto, said inertia member being in frictional slidable relationship with a wall of said fluid chamber, at least a portion of said wall being movable more closely toward said inertia member responsive to increased pressure within said chamber such that the frictional contact pressure between the casing and the inertia member is proportional to the fluid pressure in the chamber.

2. A torsional vibration damper comprising an annular casing adapted to be secured concentrically to a rotary member for rotation therewith, said casing having an annular chamber therein containing a liquid and an annular inertia member supported concentrically within said casing for rotation with respect thereto, said inertia member being in frictional slidable relationship with a wall of said fluid chamber and said wall being adapted to be pressed more closely toward said inertia member by increased pressure in the chamber such that the frictional contact pressure between the casing and the inertia member is proportional to the centrifugal force induced fluid pressure in the chamber.

3. A torsional vibration damper comprising an annular casing adapted to be secured to a rotary member for rotation therewith, a pair of spaced annular chambers in said casing having opposed annular side walls, each of said chambers containing a liquid, and an annular inertia member positioned concentrically within said casing between said side walls and rotatable with respect thereto, said inertia member having annular side surfaces in frictional slidable contact with said side walls and said side walls being distortable toward each other and against the side surfaces of said inertia member whereby the frictional contact pressure between the inertia member and the side walls is proportional to the centrifugally induced liquid pressure within said chambers.

4. A torsional vibration damper as set forth in claim 3 wherein each of said chambers has an outer side wall which is bowed outwardly so as to have an arcuate cross section.

5. A torsional vibration damper comprising an annular casing adapted to be secured concentrically to a rotary member for rotation therewith, said casing having a chamber therein containing a liquid, a wall of said chamber having an outer surface formed by a friction material, and an annular inertia member supported concentrically within said casing for rotation with respect thereto, said inertia member being in slidable contact with the outer surface of said wall and said wall being flexible such that the frictional contact pressure between the casing and the inertia member is proportional to the fluid pressure in the chamber.

References Cited by the Examiner

UNITED STATES PATENTS 1,719,805   7/1929   Hammond _____ 74—574

MILTON KAUFMAN, *Primary Examiner.*

W. S. RATLIFF, *Assistant Examiner.*